May 10, 1966  B. H. SOLES  3,250,148
ADJUSTABLE HANDLE FOR STEM OPERATED DEVICES
Filed June 3, 1963  2 Sheets-Sheet 1
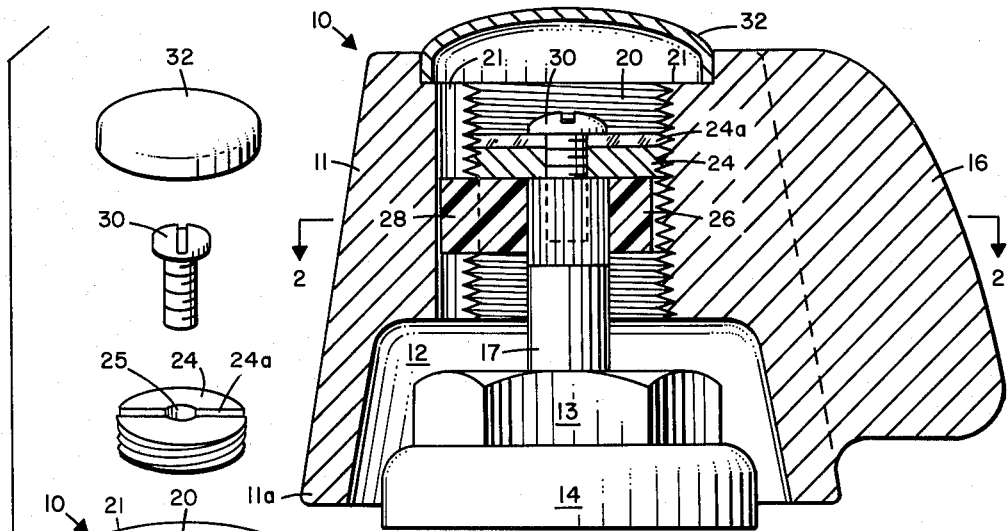
Fig. 1
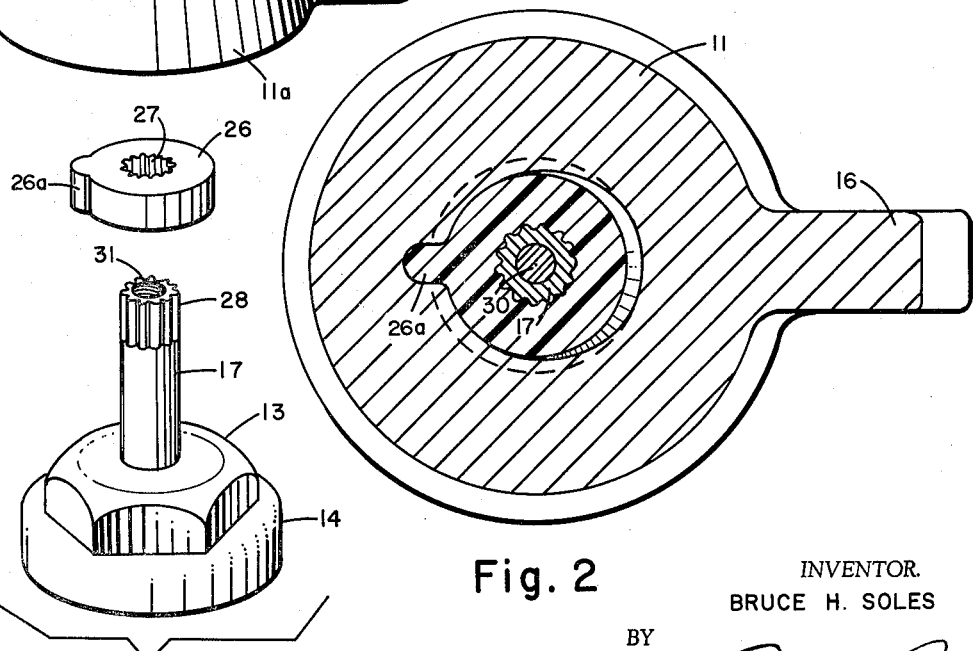
Fig. 2
Fig. 3
INVENTOR.
BRUCE H. SOLES
BY
ATTORNEY

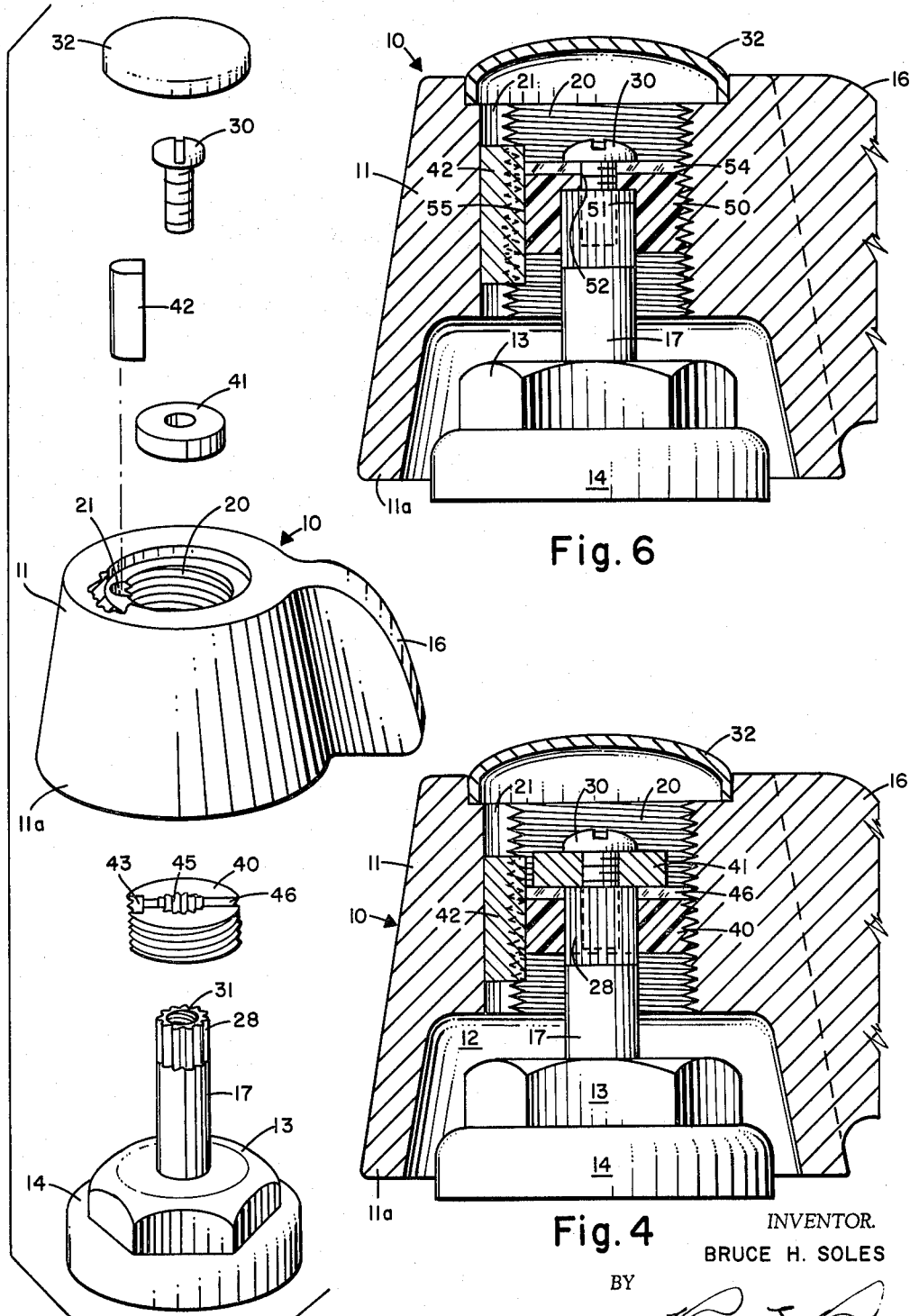

United States Patent Office

3,250,148
Patented May 10, 1966

3,250,148
ADJUSTABLE HANDLE FOR STEM OPERATED DEVICES
Bruce H. Soles, 1911 Arrowhead Drive NE., St. Petersburg, Fla.
Filed June 3, 1963, Ser. No. 285,562
7 Claims. (Cl. 74—548)

This invention relates to adjustable handles for stem operated devices such as water faucets and the like, and more particularly to handles which are adapted to be secured to rotatable stems in selected positions axially thereof.

The wide variety of plumbing fixtures of different styles and manufactures available today include such a diversity of valves and faucets for sinks, washstands, bathtubs, showers and the like, that it has become increasingly difficult for plumbing specialty supply outlets and domestic service men to keep on hand suitable replacement parts such as faucet handles, faucet or bib washers, and the like. The matter of faucet handles alone has become a considerable problem with the introduction of the more modern styles of faucets utilizing what is known as a canopy type handle which has an annular skirt defining a recess in the lower side thereof for receiving and shielding from view the faucet packing nut and sometimes a portion of the faucet body, thereby presenting a more stylish and pleasing appearance. Faucets having canopy handles and of different manufacture are often found to have operating stems of widely varying length, for which reason the handles thereof are not interchangeable nor has a suitable universal replacement handle of the canopy type been available therefor. In addition, the stems of faucets of different manufacture are provided with a variety of end configurations, usually splines of varying depth and number, for mating engagement with the handles.

With the foregoing problems in mind, it is a principal object of this invention to provide a novel replacement handle for faucets, valves, and the like having stems of varying lengths, and which handle comprises means for mounting the handle at a selected position axially of the stem, thereby avoiding interference with the packing nut in the case of short stems and avoiding an unsightly gap in the case of longer stems, and achieving equal height of both handles in dual installations.

As another object this invention aims to provide a universal replacement handle having the foregoing character of axial adjustability and which comprises a removable insert member having an opening configured to receive the end of the stem in non-rotating relation, and which insert members may be selected from an assortment of such members to match a wide variety of stem ends, whereby a single handle body and a relatively inexpensive and easily stored and carried assortment of insert members will relieve a repair man or parts supplier of the necessity of stocking a wide variety of relatively expensive complete handles.

It is another object of this invention to accomplish the foregoing objects through the provision of a handle comprising a handle body having an internally threaded axial bore, adjusting means threadedly engaged in the bore for selective positioning therealong, the adjusting means comprising a stem end receiving opening and means for securing a stem end therein against rotation, and key means cooperating between the handle body and the adjusting means to prevent rotation thereof with respect to the handle body. In a preferred embodiment the adjusting means comprises a first washer-like member which is threaded into the bore to provide a selectively positionable abutment, and a second member, preferably formed of a durable plastic material such as "nylon" and having a stem end receiving opening, and screw means for securing the first and second members to the stem end. In this preferred embodiment, the key means is conveniently formed integrally with the second or stem receiving member and engages in a keyway in the threaded bore.

The invention may be further said to reside in certain constructions and arrangements of parts by which the foregoing objects and advantages as well as others are achieved as will become apparent from the following detailed description of presently preferred embodiments of the invention, and from the accompanying sheets of drawings forming a part of this specification, and in which—

FIG. 1 is a vertical sectional view of an adjustable handle embodying this invention shown in association with a faucet stem;

FIG. 2 is a sectional view of the handle of FIG. 1 taken substantially along line 2—2 thereof;

FIG. 3 is an exploded perspective view showing the relative order of assembly of components of the handle of FIG. 1;

FIG. 4 is a vertical sectional view similar to FIG. 1 but showing a modified handle embodying the invention;

FIG. 5 is a perspective exploded view illustrating the components of the handle of FIG. 4; and FIG. 6 is a vertical sectional view of another handle embodying the invention.

In the form of the invention shown in FIGS. 1 through 3, there is provided an adjustable handle 10 embodying the invention. The handle 10 comprises a handle body 11 which is preferably formed as a casting of metal such as brass, white metal, or the like. The handle body 11 is provided with an annular skirt 11a which defines a recess 12 and shrouds a valve packing nut 13 and, in this example, a portion 14 of the body of an associated faucet, valve, or the like. The handle body 11 is provided with the usual radially extending lever portion 16 for effecting rotation of the handle 10 and of a supporting stem 17 forming part of the faucet or valve concerned.

An internally threaded axial bore 20 extends through the handle body 11 from the recess 12 to a shallow recess 21 in the upper surface of the handle. A keyway 21 is formed in the handle body 11 parallel to the axis of the bore 20 and opens into the bore for a purpose which will become apparent as the description proceeds.

An externally threaded, washer-like member 24 is provided with a central opening 25 and a transverse groove or slot 24a for the reception of a screwdriver blade. The member 24 is threadedly engaged in the bore 20 and may be rotated by a screwdriver engaged in the slot 24a to selectively position it along the bore.

Disposed against the threaded member 24 in the bore 20 is an insert member 26 having a stem end receiving opening 27 which has a complementary configuration to splines 28 or other geometric configuration on the end of the stem 17. The insert member 26 is preferably formed of a tough but resilient material such as nylon and is provided with an integral key 26a which is slidably received in the keyway 21.

The stem 17, the threaded member 24, and the insert member 26 are fixed together in their assembled relation of FIG. 1 by a machine screw 30 extending downwardly through the threaded member 24 and engaged in a threaded opening 31 in the end of the stem 17. It will be recognized that the head of the screw 30 overlies the threaded member 24 preventing upward movement of the handle 10 from the stem 17, while the end of the stem bears against the underside of the threaded member preventing downward movement of the handle with respect to the stem. The insert member 26 which is tightly splined to the stem 17 and which is keyed to the handle 10 by the key 26a and keyway 21, serves to transmit rotational driving force to the stem 17 upon rotation of the handle 10 to open or close the associated faucet.

It will be recognized that during installation of the handle 10, the threaded member 24 may be positioned in the bore 20 to provide a proper axial relationship of the handle to the stem 17 when the latter bears against the lower side of the threaded member. This may be accomplished either before or after the insert 26 is assembled on the splines 28 of the stem 17, the screw 30 then being installed and tightened to complete the installation with the exception of pressing a cover or button 32 into the recess 21 to provide a neat and finished appearance. Of course, the button 32 may conveniently present a suitable indicia for identifying the handle as to Hot or Cold water, Drain, or the like.

By providing a suitable assortment of insert members 26 having stem end receiving openings 27 corresponding to the different known configurations of the stem ends to be serviced, a single handle 10 may be utilized as a replacement for a wide variety of faucets or valves of different manufacture having distinctive stem end configurations as well as substantial differences in stem lengths.

Referring now to the modification of FIGS. 4 and 5, the adjusting means comprises an externally threaded member 40 which is engaged in the internally threaded bore of the handle body 11, a plain annular washer 41 secured to the end of the stem 17 by screw 30, and a key 42 which is lodged in the keyway 21 of the handle body and engages a keyway 43 formed in the threaded member 40.

The threaded member 40, which is conveniently made of nylon or the like, is provided with an internally splined opening 45 for receiving the splined end 28 of the stem 17 with a press fit. In addition, the threaded member 40 is provided with a transverse screwdriver slot 46 for use in selectively positioning the member 40 along the internally threaded bore 20 to a position corresponding to the length of the stem 17. When this position is located, the member 40 is turned in the bore 20 just sufficiently to bring its keyway 43 in registration with the keyway 21 to permit insertion of the key 42. Thereafter, with the stem 17, washer 41, and screw 30 assembled as illustrated in FIG. 4, rotation of the handle 10 will produce the desired rotation in the stem 17.

Referring now to the form of the invention illustrated in FIG. 6, it will be seen that the adjusting means comprises an externally threaded adjusting member 50 having an internally splined stem end receiving opening 51 extending only partially therethrough, and merging with a smaller in diameter, screw receiving opening 52. The threaded member 50, which is also provided with a transverse screwdriver slot 54 and a keyway 55, is secured to the stem end by the screw 30, as shown.

During assembly, the member 50 is selectively positioned in the internally threaded bore 20 in accordance with the length of the stem 17, and is secured in its adjusted position by the key 42 which is lodged in the keyways 21 and 55. As in the case of the stem receiving member 26 of the first embodiment, the stem receiving members 40 and 50 of the latter two embodiments may be selected from a suitable assortment of such members, the stem receiving openings 45 and 51 of which are configured to match different configurations of stem ends provided by a variety of manufacturers.

From the foregoing detailed description of adjustable handles embodying my invention, it will be appreciated that the previously enumerated objects and advantages, as well as others apparent herefrom, have been attained in a particularly novel and effective manner. It will also be appreciated that the adjustable handles embodying this invention will be durable in use, simple of manufacture, and capable of almost universal application to the wide variety of existing stem operated fixtures.

Of course, certain changes, variations, and equivalents will be apparent to those skilled in the art to which the invention pertains. Accordingly, although the invention has been described in considerable detail with reference to specific adjustable handles embodying the invention, it will be understood that the invention is not limited thereto, but rather the invention includes all those modifications, adaptations, substitutions, and uses as are reasonably embraced by the scope of the claims hereof.

Having described my invention, I claim:

1. A handle for stem operated devices, said handle comprising:
   (a) a handle body having an internally threaded bore,
   (b) adjusting means threadedly engaged in said bore for selective positioning therealong, said adjusting means comprising an upper part extending transversely of said bore and forming an abutment limiting the movement of a stem into said bore and a lower part having a stem end receiving opening, means for securing a stem end against rotation in said opening, and
   (c) key means cooperating between said handle body and said adjusting means to prevent rotation thereof with said respect to said handle body.

2. A handle as defined in claim 1 and wherein said adjusting means comprises a first member threaded in said bore to provide a selectively positionable abutment, a second member having said stem end receiving opening, and screw means for securing said first and second members to a stem end.

3. A handle as defined in claim 2 and wherein said key means is integral with said second member and engages a keyway opening into said bore.

4. A handle as defined in claim 3 wherein said second member is formed of relatively yieldable material.

5. A handle as defined in claim 1 and wherein said body comprises a first keyway opening into said bore, and said adjusting means comprises a member threaded in said bore and having a second keyway parallel to said first keyway, said member having said stem end receiving opening, and screw means for securing said adjusting means to a stem in said opening, said keyways being alignable at a plurality of positions of said member along said bore to receive said key means.

6. An adjustable handle for use on stem controlled devices, said handle comprising:
   (a) a handle body having an internally threaded bore coaxial with the axis of rotation of the handle,
   (b) adjusting means threadedly engaged in said bore for selective positioning therealong,
   (c) said adjusting means comprising a member having a stem receiving opening,
   (d) means for securing said adjusting means to a stem in said opening,
and
   (e) key means cooperating between said body and said member for preventing relative rotation therebetween.

7. An adjustable handle for use on stem controlled devices, said handle comprising:
   (a) a handle body having an annular skirt depending therefrom defining a cavity for shrouding portions of a device when associated therewith,
   (b) said handle body having an axial bore therethrough opening into said cavity,
   (c) adjusting means threadedly engaged in said bore for selective positioning therealong, (d) said adjusting means comprising a member having an externally threaded portion including a screwdriver slot, said member having a stem end receiving opening, said opening having a configuration complementary the configuration of a stem end to be received, (e) means for securing said adjusting means to the end of a stem in said opening, and (f) key means cooperating between said member and a keyway in said body and opening into said bore.

References Cited by the Examiner

UNITED STATES PATENTS 1,989,083  1/1935  Dahnken et al. _____ 287—53

MILTON KAUFMAN, *Primary Examiner.*